United States Patent [19]

Dallas

[11] Patent Number: 4,953,949
[45] Date of Patent: Sep. 4, 1990

[54] DEVICE FOR FORMING A PICTURE

[75] Inventor: William J. Dallas, Tucson, Ariz.

[73] Assignee: U.S. Philips Corporation, New York, N.Y.

[21] Appl. No.: 346,275

[22] Filed: Apr. 28, 1989

Related U.S. Application Data

[63] Continuation of Ser. No. 810,440, Dec. 17, 1985, abandoned.

[30] Foreign Application Priority Data

Dec. 17, 1984 [DE] Fed. Rep. of Germany ....... 3445973

[51] Int. Cl.⁵ .............................................. G02B 27/22
[52] U.S. Cl. ..................................... 350/130; 340/754
[58] Field of Search ............... 350/130, 131, 141, 144, 350/132, 335; 340/752, 754

[56] References Cited

U.S. PATENT DOCUMENTS

| | | | |
|---|---|---|---|
| 3,891,305 | 6/1975 | Fader | 350/144 |
| 4,384,763 | 5/1983 | Russo | 350/335 |
| 4,547,043 | 10/1985 | Penz | 350/335 |
| 4,717,949 | 1/1988 | Eichenlaub | 350/131 |

FOREIGN PATENT DOCUMENTS 0135548 10/1979 Japan ................................. 350/130

*Primary Examiner*—Bruce Y. Arnold
*Assistant Examiner*—Ronald M. Kachmarik
*Attorney, Agent, or Firm*—Paul R. Miller

[57] ABSTRACT

For forming a composite picture, at least two transparent constituent pictures (12, 13) are arranged on behind the other with the transmittances of the individual picture elements (21-25) being selected in such a way that the average value of the products of the transmittances of those picture elements of the constituent pictures which are disposed behind each other in the viewing direction, taken over a plurality of adjacent picture elements, yields the transmitttance of the composite picture to be formed. The two constituent pictures may be entirely independent of each other and of the picture to be generated, whereby only the range of transmittance values is limited to a specific extent. If the two constituent pictures are arranged one behind the other with a specific spacing it is also possible to obtain steroscopic pictures. In this particular case the two constituent pictures may be formed by LCD displays, which rotate the plane of polarization of the transmitted light (18a, 18b, 18c).

8 Claims, 1 Drawing Sheet

DEVICE FOR FORMING A PICTURE

This application is a continuation of previous U.S. application Ser. No. 810,440, filed Dec. 17, 1985, (now abandoned) and all benefits for such earlier application are hereby claimed for this new continuation application.

The invention relates to a device for forming a picture from picture elements having such dimensions that they cannot be resolved by the human eye at the normal viewing distance.

BACKGROUND OF THE INVENTION

Forming pictures from separate picture elements of such a size that they cannot be resolved by the human eye at the normal viewing distance is generally known, for example from newspaper printing. The grey tone of the individual picture elements is determined, for example, by the size of a black dot against the bright background of the picture element. Thus, although only two intensity values, namely black or white, are available, it is also possible, to display intermediate values or grey shades.

SUMMARY OF THE INVENTION

It is the object of the invention to provide a device for forming a picture which utilizes the principle of forming pictures from small picture elements in a novel manner.

According to the invention this object is achieved in that at least two transparent constituent pictures are arranged one behond the other with the transmittances of the picture elements of the pictures being selected in such a way that the average value of the products of the transmittances of those picture elements of the two constituent pictures which are situated behind each other in the viewing direction, taken over a plurality of adjacent picture elements forming a picture area, corresponds to the transmittance of the picture to be formed in the picture area.

The constituent pictures used for this purpose are in principle independent of each other and are also independent of the picture to be formed because the transmittance of the latter can be divided between the two constituent pictures so as to vary from picture element to picture element. As a result of this, the constituent pictures may be composed in such a way that the composite picture obtained by arranging these constituent pictures one behind the other cannot be recognised in these constituent pictures. In this way the pictures can be encoded. Another use is to test other devices for generating pictures, for example, plotters or digital film recording apparatus, in that by means of the apparatus to be tested one constituent picture is formed and brought in register with the associated exactly recorded other constituent picture with a required composite picture being obtained only if the picture formed by means of the apparatus to be tested is reproduced without distortion.

In the extreme case the two constituent pictures may be images of different objects or scenes which when positioned one behind the other yield a third image or scene which is independent of the first two.

In order to enable the composite picture to be observed in the same way from different viewing angles, it is effective to arrange the constituent pictures one directly behind the other. In that case always the same picture elements of the constituent pictures will appear superimposed for different viewing positions.

By means of the device in accordance with the invention it is also possible to form stereoscopic pictures. To this end an embodiment of the invention is characterized in that the constituent pictures are spaced at such distance from each other that when they are observed with both eyes different picture elements of the two constituent pictures appear to be situated one behind the other for each eye, and in that the products of the transmittances of the pairs of picture elements which appear to be situated one behind the other and which differ for each eye yield the two stereoscopic views of a scene. However, the viewing angle for discerning the stereoscopic picture is then limited.

In the simplest case the constituent pictures may be transparent film pictures. In this way stationary images are possible. For formation of pictures containing images or scenes which vary in time, however, it is effective that the constituent pictures are formed by devices in which the transmittances of the individual picture elements can be controlled electrically. Preferably, such a device is an LCD display which rotates the plane of polarization of the transmitted light depending on the control signals and which is arranged between two polarizers. This last-mentioned embodiment is particularly suitable for displaying stereoscopic pictures, for example for television purposes.

BRIEF DESCRIPTION OF THE DRAWINGS

Embodiments of the invention will now be described in more detail, by way of example, with reference to the accompanying drawing. In the drawing.

DESCRIPTION OF THE PREFERRED EMBODIMENT(S)

Figure 1:
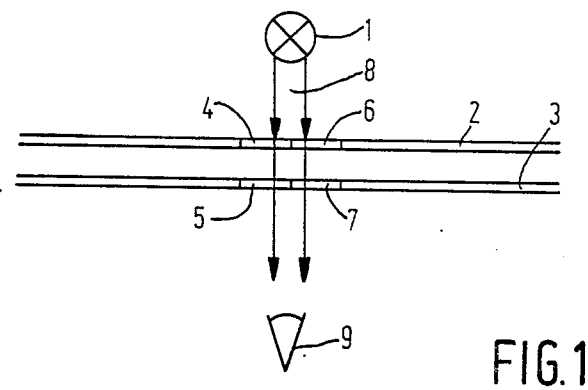
FIG. 1 illustrates how a picture is formed from two constituent pictures with the three pictures being largely independent of each other.

In FIG. 1 two constituent pictures 2 and 3, which are shown in cross-section, are situated close to each other. On one side of the two constituent pictures a light source 1 is arranged with light rays 8 traversing the two pictures 2 and 3 and being incident on the eye 9 of the observer. One of the two light rays shown traverses the picture element 4 of the constituent picture 2 and the picture element 5 of the constituent picture 3, so that the observer's eye 9 sees a picture element whose resulting transmittance is equal to the product of the transmittances of the picture elements 4 and 5. In a similar way the other light ray which traverses the picture elements 6 and 7 of the constituent pictures 2 and 3 gives the observer's eye 9 the impression of a picture element whose transmittance is equal to the product of the transmittances of the two pictures elements 6 and 7. The dimensions of the individual picture elements 4, 5, 6 and 7 are so small that they cannot separately be discerned by the eye, so that the pair of picture elements 4,5 as well as the pair 6, 7 appear as one picture area in which transmittance is equal to the average value of the resulting transmittances. If the dimensions of the individual picture elements are small enough, further adjacent pictures elements, not shown, of the two constituent pictures 2 and 3 will also contribute to the overall impression of one picture area.

If for simplicity only two adjacent picture elements are considered, the transmittances of the picture elements 4 and 6 are designated a and b, and the transmittances of the picture elements 5 and 7 are designated c and d, the resulting transmittance of the picture area constituted by the two picture elements 4 and 6 is X, that of the picture area constituted by the picture elements 5 and 7 is Y, the resulting transmittance of the four picture elements is P, and the separation of the picture area constituted by picture elements 4 and 6 and the picture area constituted by the picture elements 5 and 7 is S, and the separation between the picture elements 4 and 6 or the picture elements 5 and 7 is $\Delta x$, the following relationships are obtained:

$$a+b=2X; \quad c+d=2Y; \quad 0 \leq a, b, c, d \leq 1 \qquad (1)$$

$$ac+bd=2P; \quad 0<p\leq 1 \qquad (2)$$

It is further assumed that the two pictures are in principle independent of each other and of the resulting picture produced by arranging the pictures one behind the other, i.e. if the values X, Y and P are given, this yields the following conditions for the transmittances of the individual picture elements;

$$\max\left[Y, \frac{P}{X}, 2Y - \frac{P}{X}, \frac{(2X-1)Y - P}{X-1}, 2Y - 1\right] \leq \qquad (3)$$

$$\frac{S}{\Delta x} \leq \min[1, 2Y - 1]$$

or $$\max[0, 2Y - 1] \leq \frac{S}{\Delta x} \leq$$

$$\min\left[1, Y, \frac{P}{X}, 2Y - \frac{P}{X}, \frac{(2X-1)Y - P}{X-1}, 2Y\right]$$

In order to enable these equations to be solved for all combinations of given transmittances of the pictures, it may be necessary to limit the range of the transmittances of the individual pictures.

Figure 2A:
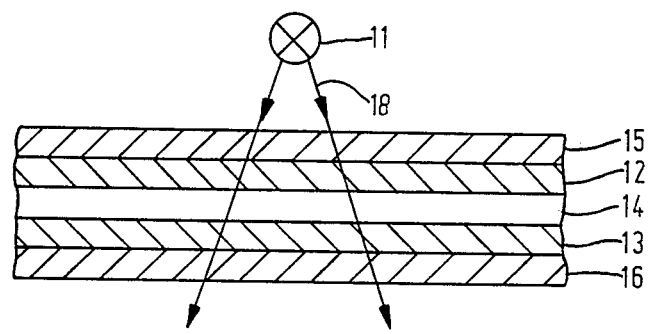
FIGS. 2a and 2b show a device for the formation of stereoscopic pictures.
Figure 2B:
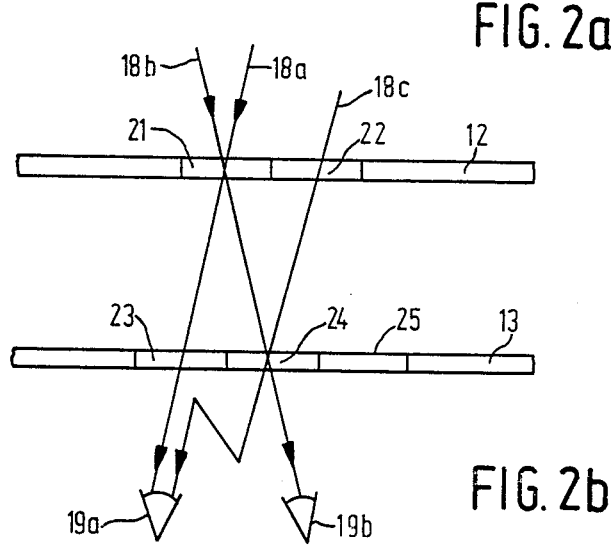

A device for displaying picture sequences representing a moving picture is shown in FIGS. 2a and 2b. This example is particularly suitable for producing stereoscopic pictures for television purposes.

FIG. 2a is a cross-sectional view of the complete device. The two constituent pictures are each formed by a liquid crystal display hereinafter LCD display devices 12 and 13, which devices are spaced from each other by a spacing 14. Such LCD devices rotate the plane of polarisation of the transmitted light through an angle which can be influenced by a control voltage. A polarizer 15 is arranged before the display device 12 and selects from the light 18 issuing from the light source 11 a component having a specific plane of polarization. Similarly, a further polarizer 16, which functions as an analyser, is arranged behind the display device 13 viewed in the direction of propagation of the light and transmits more or less light depending on the rotation of the plane of polarization of the light 18. In this device the picture elements of the two constituent pictures generated by means of the LCD devices 12 and 13 have no individual transmittances in the actual sense of the word but the transmittance of a picture element in the resulting picture depends on the sum of the rotations of the plane of polarization of the light ray traversing the two devices 12 and 13 and on the polarization direction of the two polarizers 15 and 16 relative to one another.

FIG. 2b illustrates the situation for a stereoscopic picture. The left eye 19a of the observer receives the light ray 18a, which has passed through the picture element 21 of the device 12 and the picture element 23 of the device 13. Similarly, the right eye 19b receives the light ray 18b which has passed through the same picture element 21 of the device 12 and through a different picture element 24 of the device 13. Also the adjacent resulting picture element for the left eye 19a is formed by the picture element 22 of the device 12 and the picture element 24 of the device 13, which elements are traversed by the light ray 18c. Allowance is to be made for the fact that FIG. 2b is not to scale with the spacing between the eyes 19a and 19b of the observer of the devices 12 and 13 being substantially larger in reality and the dimensions of the picture elements relative to the spacing between the devices 12 and 13 being substantially smaller.

The angle through which the plane of polarization is to be rotated at the individual picture elements of the two devices 12 and 13 can be determined as follows. The transmittance or intensities with which a picture element is observed by the right eye and the left eye are designated $P_n$ and $Q_n$, where $$P_n = |\cos \theta_n|; \quad Q_n = |\cos \phi_n| \qquad (4)$$

and where $\theta_n$ and $\phi_n$ represent the overall rotation of the plane of polarisation experienced, by, for example, the light rays 18a and 18b. Since these rotations of the plane of polarization are additively superimposed, the following equations are valid:

$$a_n + b_n = \theta_n$$

$$a_n + b_{n+1} = \phi_n \qquad (5)$$

where $a_n$ is the rotation of the plane of polarization at the picture element 21 of the device 12, $b_n$ is the rotation at the picture element 23, and $b_{n+1}$ is the rotation of the picture element 24 of the device 13. In general, there are several angles of rotation which comply with these requirements. Preferably, the angles of rotation of the plane of polarization are distributed substantially uniformly between the two devices 12 and 13. A recursive solution of the last mentioned equation is as follows:

$$a_n = \theta_n - b_n$$

$$b_{n+1} = \phi_n - a_n \qquad (6)$$

where all the angles are to be considered modulo $2\pi$. In particular, in the case of a television picture the first value at the beginning of the line may be set to zero, which directly yields the solution for the angles of the consecutive individual picture elements of a line. This can be effected very simply by electronic means.

In general, specifically in the case illustrated in FIG. 1, a multi-dimensional dependence of the picture elements may be adopted, i.e. a picture area comprises more than two picture elements in a two-dimensional array. The individual grey-scale values and angular rotations of the plane of polarization are then determined in a slightly different manner.

What is claimed is:

1. A device for forming a picture from picture elements too small to be resolved by human eyes at normal viewing distances comprising
   a first transparent constituent picture including a distributed plurality of adjacent first picture elements in a first plane, each of said first picture elements being of a size too small to be resolved by human eyes at normal viewing distances,
   a second transparent constituent picture disposed behind said first transparent constituent picture in a viewing direction but separated from said first transparent constituent picture by a small amount, said second transparent constituent picture including a distributed plurality of adjacent second picture elements in a second plane, each of said second picture elements also being of a size too small to be resolved by human eyes at normal viewing distances, and
   a composite picture provided to said human eyes at said normal viewing distances from said first and second constituent pictures, said composite picture including a distributed plurality of third picture elements, said third picture elements having a transmittance equal to the product of the respective transmittance of said first and second picture elements forming said third picture elements, said composite picture having a transmittance equal to an average value of the products of transmittance of said first and second constituent pictures.

2. A device according to claim 1, wherein said first and second constituent pictures are independent of each other and each also independent of said composite picture.

3. A device according to claim 1 or claim 2, wherein said first and second constituent pictures are disposed directly behind one another in said viewing direction.

4. A device according to claim 1, wherein said first and second constituent pictures are spaced from one another in said viewing direction to enable each human eye of a person to view different ones of said first and second picture elements, said different ones of said first and second picture elements being viewed by each eye as being behind one another for each eye, and wherein said products of respective transmittances for said different ones of said picture elements for each eye yield stereoscopic views of said composite picture.

5. A device according to claim 4, wherein said first and second constituent pictures are provided by electrically controlled structures, said structures being separated in the viewing direction, and wherein said structures display picture sequences representing a moving picture.

6. A device according to claim 5, wherein said electrically controlled structures include LCD displays for rotating polarization of light passing through said first and second constituent pictures, said LCD displays having control signals applied thereto, and wherein said first and second constituent pictures are disposed between polarizers.

7. A device according to claim 1 or 2, wherein said first and second constituent pictures are provided by electrically controlled structures, said structures being separated in the viewing direction, and wherein said structures display picture sequences representing a moving picture.

8. A device according to claim 7, wherein said electrically controlled structures include LCD displays for rotating polarization of light passing through said first and second constituent pictures, said LCD displays having control signals applied thereto, and wherein said first and second constituent pictures are disposed between polarizers.

* * * * *